US012054158B2

(12) United States Patent
Park

(10) Patent No.: US 12,054,158 B2
(45) Date of Patent: Aug. 6, 2024

(54) VEHICLE CONFIGURED TO CHECK NUMBER OF PASSENGERS AND METHOD OF CONTROLLING THE SAME

(71) Applicants: Hyundai Motor Company, Seoul (KR); Kia Corporation, Seoul (KR)

(72) Inventor: Sungchan Park, Chungcheongnam-Do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 379 days.

(21) Appl. No.: 17/487,831

(22) Filed: Sep. 28, 2021

(65) Prior Publication Data

US 2022/0176969 A1    Jun. 9, 2022

(30) Foreign Application Priority Data

Dec. 7, 2020  (KR) .................. 10-2020-0169616

(51) Int. Cl.
*B60W 40/08* (2012.01)
*B60Q 3/74* (2017.01)
(Continued)

(52) U.S. Cl.
CPC .............. *B60W 40/08* (2013.01); *B60Q 3/74* (2017.02); *B60Q 3/80* (2017.02); *B60R 16/023* (2013.01); *B60W 50/14* (2013.01); *G06V 40/174* (2022.01); *B60W 2040/0881* (2013.01); *B60W 2050/146* (2013.01); *B60W 2420/403* (2013.01); *B60W 2520/04* (2013.01); *B60W 2540/01* (2020.02); *B60W 2540/227* (2020.02); *G06V 2201/07* (2022.01)

(58) Field of Classification Search
None
See application file for complete search history.

(56) References Cited

U.S. PATENT DOCUMENTS 9,812,151 B1 * 11/2017 Amini ................... G06T 13/40
9,965,819 B1 *  5/2018 DeVries ............... G06Q 50/265
(Continued)

FOREIGN PATENT DOCUMENTS

BR    102019000743 A2 *  7/2020 ............. B60Q 1/50
CN       109564710 A  *  4/2019 ............. G06F 21/32
(Continued)

*Primary Examiner* — Kevin R Steckbauer
(74) *Attorney, Agent, or Firm* — Fox Rothschild LLP

(57) ABSTRACT

A vehicle, in a temporary stop state during driving, is configured to identify a passenger failing to re-board after alighting, and communicate with the passenger to guide the passenger to re-board the vehicle. A method of controlling the vehicle includes primarily checking a number of passengers inside the vehicle through analysis of a first image obtained by photographing an interior of the vehicle when the vehicle enters a stop state during driving; in response to the vehicle being restarted after the stop, secondly checking the number of the passengers inside the vehicle through analysis of a second image obtained by photographing the interior of the vehicle; and in response to the secondly checked number of the passengers being less than the primarily checked number of the passengers, identifying that the passenger failing to re-board after alighting from the vehicle exists.

22 Claims, 9 Drawing Sheets

(51) Int. Cl.
  *B60Q 3/80* (2017.01)
  *B60R 16/023* (2006.01)
  *B60W 50/14* (2020.01)
  *G06V 40/16* (2022.01)

(56) References Cited

U.S. PATENT DOCUMENTS

| | | | | |
|---|---|---|---|---|
| 10,079,029 | B2 * | 9/2018 | Amini | G06V 40/172 |
| 11,501,565 | B2 * | 11/2022 | Tanaka | G06V 20/593 |
| 11,599,617 | B2 * | 3/2023 | McManus | G06Q 10/06315 |
| 2018/0144761 | A1 * | 5/2018 | Amini | G06V 20/40 |
| 2019/0114563 | A1 * | 4/2019 | Yukimoto | G07C 9/00 |
| 2019/0197325 | A1 * | 6/2019 | Reiley | G08B 21/24 |
| 2020/0223352 | A1 * | 7/2020 | Toshio Kimura | B60Q 1/547 |
| 2020/0393835 | A1 * | 12/2020 | Gregg | G01C 21/3438 |
| 2021/0070307 | A1 * | 3/2021 | Welch | G02B 27/0172 |
| 2022/0176969 | A1 * | 6/2022 | Park | B60Q 3/80 |
| 2022/0281486 | A1 * | 9/2022 | Sakurada | G06V 40/172 |
| 2022/0350872 | A1 * | 11/2022 | McManus | G01C 21/3484 |
| 2022/0398765 | A1 * | 12/2022 | Tomatsu | G06V 40/10 |
| 2022/0415172 | A1 * | 12/2022 | Saito | G06V 20/593 |
| 2023/0202527 | A1 * | 6/2023 | McManus | G06F 21/32 701/26 |
| 2023/0202528 | A1 * | 6/2023 | McManus | G01C 21/3484 701/26 |

FOREIGN PATENT DOCUMENTS

| | | | | | |
|---|---|---|---|---|---|
| CN | 113392718 | A | * | 9/2021 | |
| CN | 114489326 | A | * | 5/2022 | |
| CN | 108284829 | B | * | 2/2023 | B60W 10/026 |
| JP | 6145210 | B1 | * | 6/2017 | G06F 21/32 |
| JP | 2018106315 | A | * | 7/2018 | G06F 21/32 |
| JP | 2021167497 | A | * | 10/2021 | |
| JP | 2022190504 | A | * | 12/2022 | G06T 7/70 |
| KR | 200273277 | Y1 | | 4/2002 | |
| KR | 2013-0085833 | A | | 7/2013 | |
| KR | 102142073 | B1 | | 8/2020 | |
| WO | WO-2018093770 | A2 | * | 5/2018 | G06K 9/00302 |

* cited by examiner

VEHICLE CONFIGURED TO CHECK NUMBER OF PASSENGERS AND METHOD OF CONTROLLING THE SAME

CROSS-REFERENCE TO RELATED APPLICATION

This application claims under 35 U.S.C. § 119 the benefit of Korean Patent Application No. 10-2020-0169616, filed on Dec. 7, 2020 in the Korean Intellectual Property Office, the entire contents of which are incorporated herein by reference.

BACKGROUND

1. Technical Field

The present disclosure relates to a vehicle, more particularly, to the vehicle configured to identify the number of passengers in the vehicle.

2. Description of the Related Art

When a plurality of passengers move using one vehicle, there is a situation in which some passengers alight (i.e., get out of the vehicle) at an intermediate point and re-board. Alternatively, there is a situation in which a large number of passengers arrive at a destination, so all passengers alight from the vehicle.

In this regard, existing technology may identify and notify the existence of the remaining passengers without alighting from the vehicle. However, there is a case in which when passengers temporarily alight at an intermediate stop other than the final destination and then board again, the vehicle may restart without the passengers reboarded. Accordingly, a method of addressing such a limitation is required.

SUMMARY

Therefore, the disclosure provides that a vehicle, in a temporary stop state during driving, is configured to identify some passenger failing to re-board after alighting, and communicate with the passenger to guide the passenger to re-board the vehicle.

Additional aspects of the disclosure will be set forth in part in the description which follows and, in part, will be obvious from the description, or may be learned by practice of the disclosure.

According to an aspect of the disclosure, there is provided a method of controlling a vehicle, the method including: primarily checking a number of passengers inside the vehicle through analysis of a first image obtained by photographing an interior of the vehicle when the vehicle enters a stop state; in response to a door signal of the vehicle being generated, secondly checking the number of the passengers inside the vehicle through analysis of a second image obtained by photographing the interior of the vehicle; and in response to the secondly checked number of the passengers being less than the primarily checked number of the passengers, displaying that a passenger to re-board after alighting exists through a display device of the vehicle.

The method may further include, upon identifying that the passenger to re-board after alighting exists, checking a point adjacent to the vehicle at which stop is performable to pick up the passenger to re-board after alighting, and searching for a stoppable point when the stop is not performable in the point.

The method may further include notifying a current location of the vehicle to the passenger to re-board after alighting while moving the vehicle to the stoppable point.

The method may further include: re-stopping to pick up the passenger to re-board after alighting; in response to a door signal of the vehicle being generated again, thirdly checking the number of the passengers inside the vehicle through analysis of a third image obtained by photographing the interior of the vehicle; and in response to the thirdly checked number of the passengers being less than the firstly checked number of the passengers, identifying that the passenger to re-board after alighting exists.

The display device may be an artificial intelligence (AI) agent provided to represent a facial expression and a gesture and output a speech message.

The method may further include, when a destination of the vehicle is set in a navigation system of the vehicle, and the vehicle is stopped before the vehicle reaches the destination, identifying whether a passenger to re-board after alighting from the vehicle exists.

The method may further include: obtaining face identifications (IDs) of the passengers through analysis of images obtained by photographing the passengers in the vehicle; and in response to identifying that a passenger to re-board after alighting exists, classifying the passenger to re-board after alighting through the face ID and notifying a current location of the vehicle only to the passenger to re-board after alighting.

The method may further include: storing a re-board history regarding re-board of passengers after alighting, while the vehicle is operating; and whenever the re-board of a passenger after alighting is performed pursuant to a stop of the vehicle, identifying whether a passenger to re-board after alighting exists in a place where the vehicle is stopped, based on the stored re-board history regarding re-board of passengers after alighting.

The method may further include, when a driver of the vehicle repeats a positive answer to re-boarding at a current location by a preset number of times or more, identifying the current location of the vehicle as a place that satisfies a preset re-boarding condition, and omitting a driver acknowledgement check and performing a passenger comparison.

The method may further include, when a current location of the vehicle is a place that is set in advance as a place where re-boarding is expected after alighting, identifying the current location of the vehicle as a place that satisfies a preset re-boarding condition, and omitting a driver acknowledgement check and performing a passenger comparison.

The method may further include, when a current location of the vehicle is a place that is set in advance as a place where re-boarding is not expected after alighting, identifying the current location of the vehicle as a place that does not satisfies a preset re-boarding condition, and omitting a driver acknowledgement check and a passenger comparison.

According to another aspect of the disclosure, there is provided a vehicle including: a camera configured to photograph an interior of a vehicle; and a controller configured to primarily check a number of passengers inside the vehicle through analysis of a first image obtained by photographing an interior of the vehicle when the vehicle enters a stop state; in response to a door signal of the vehicle being generated, secondly checking the number of the passengers inside the vehicle through analysis of a second image obtained by photographing the interior of the vehicle; and in response to the secondly checked number of the passengers being less than the primarily checked number of the passengers, display that a passenger to re-board after alighting exists through a display device of the vehicle.

The controller may be configured to, upon identifying that the passenger to re-board after alighting exists, check a point adjacent to the vehicle at which stop is performable to pick up the passenger to re-board after alighting, and search for a stoppable point when the stop is not performable in the point.

The controller may be configured to notify a current location of the vehicle to the passenger to re-board after alighting while moving the vehicle to the stoppable point.

The controller may be configured to: re-stop the vehicle to pick up the passenger to re-board after alighting; in response to a door signal of the vehicle being generated again, thirdly check the number of the passengers inside the vehicle through analysis of a third image obtained by photographing the interior of the vehicle; and in response to the thirdly checked number of the passengers being less than the firstly checked number of the passengers, identify that the passenger to re-board after alighting exists.

The display device may be an artificial intelligence (AI) agent provided to represent a facial expression and a gesture and output a speech message.

When a destination of the vehicle is set in a navigation system of the vehicle, and the vehicle is stopped before the vehicle reaches the destination, it may be identified whether a passenger to re-board after alighting from the vehicle exists.

The controller may be configured to: obtain face identifications (IDs) of the passengers through analysis of images obtained by photographing the passengers in the vehicle; and in response to identifying that a passenger to re-board after alighting exists, classify the passenger to re-board after alighting through the face ID and notify a current location of the vehicle only to the passenger to re-board after alighting.

The controller may be configured to: store a re-board history regarding re-board of passengers after alighting, while the vehicle is operating; and whenever the re-board of a passenger after alighting is performed pursuant to a stop of the vehicle, identify whether a passenger to re-board after alighting exists in a place where the vehicle is stopped, based on the stored re-board history regarding re-board of passengers after alighting.

The controller may be configured to, when a driver of the vehicle repeats a positive answer to re-boarding at a current location by a preset number of times or more, identify the current location of the vehicle as a place that satisfies a preset re-boarding condition, and omit a driver acknowledgement check and perform a passenger comparison.

The controller may be configured to, when a current location of the vehicle is a place that is set in advance as a place where re-boarding is expected after alighting, identify the current location of the vehicle as a place that satisfies a preset re-boarding condition, and omit a driver acknowledgement check and perform a passenger comparison.

The controller may be configured to, when a current location of the vehicle is a place that is set in advance as a place where re-boarding is not expected after alighting, identify the current location of the vehicle as a place that does not satisfies a preset re-boarding condition, and omit a driver acknowledgement check and a passenger comparison.

According to another aspect of the disclosure, there is provided a method of controlling a vehicle, the method including: primarily checking a number of passengers inside the vehicle through analysis of a first image obtained by photographing an interior of the vehicle when the vehicle enters a stop state; in response to a door signal of the vehicle being generated, secondly checking the number of the passengers inside the vehicle through analysis of a second image obtained by photographing the interior of the vehicle; in response to the secondly checked number of the passengers being less than the primarily checked number of the passengers, identifying that a passenger to re-board after alighting exists; and in response to identifying that the passenger to re-board after alighting exists, displaying that the passenger to re-board after alighting exists through an artificial intelligence (AI) provided in the vehicle in a form of a facial expression, a gesture, and a speech message.

According to another aspect of the disclosure, there is provided a vehicle including: a camera configured to photograph an interior of the vehicle; a controller configured to: primarily check a number of passengers inside the vehicle through analysis of a first image obtained by photographing an interior of the vehicle when the vehicle enters a stop state; in response to a door signal of the vehicle being generated, secondly check the number of the passengers inside the vehicle through analysis of a second image obtained by photographing the interior of the vehicle; and in response to the secondly checked number of the passengers being less than the primarily checked number of the passengers, identify that a passenger to re-board after alighting exists; an artificial intelligence (AI) agent provided in the vehicle and configured to display that the passenger to re-board after alighting exists in a form of a facial expression, a gesture, and a speech message.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
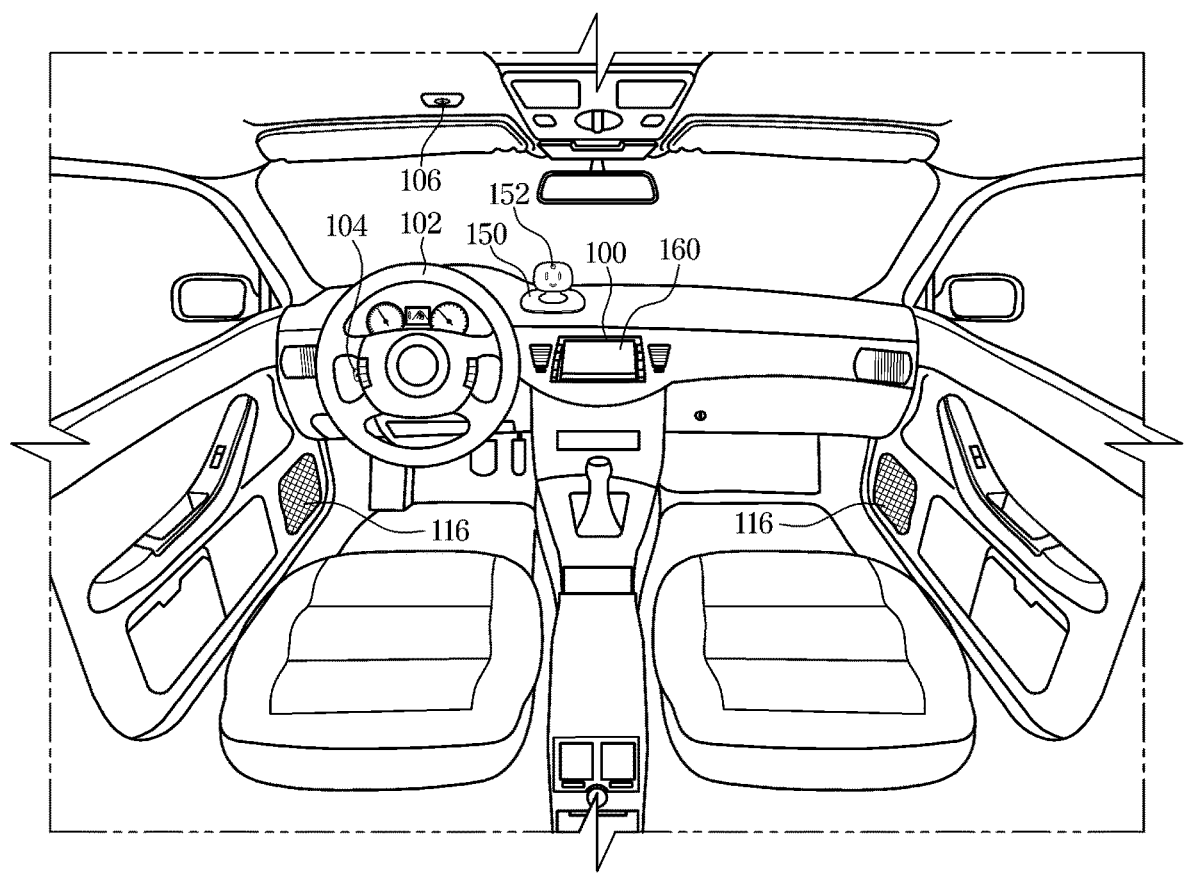
FIG. 1 is a view illustrating the interior of a vehicle according to an embodiment of the present disclosure.

FIG. 1 is a view illustrating the interior of a vehicle according to an embodiment of the present disclosure.

Referring to FIG. 1, an audio-video-navigation (AVN) system 100 and a steering wheel 102 are mounted in front of a driver's seat. The AVN system 100 is an infotainment device having capabilities of a typical AVN system with a communication function added thereto, and includes a display 160. The AVN system 100 supports a speech command function. For speech recognition control of the AVN system 100, a speech recognition button 104 is mounted on a steering wheel 102, and a microphone 106 is mounted on the upper side of the driver's seat. A speaker 116 is mounted on the left door of the driver's seat and the right door of the passenger's seat.

In FIG. 1, reference numeral 150 indicates an artificial intelligence (AI) agent (AI robot). Reference numeral 152 indicates a camera mounted on the AI agent 150. The AI agent 150 is provided to detect a situation inside the vehicle and perform an operation according to the detected situation. For example, the AI agent 150 photographs the interior of the vehicle through the camera 152 to identify the number of passengers and recognize each passenger's face, and performs a corresponding control based on the number of passengers and the face recognition result. In order to photograph the interior of the vehicle and perform identification of the number of passengers and facial recognition of each passenger, other cameras provided inside the vehicle may be used instead of the camera 152 of the AI agent 150. The operation of the AI agent 150 may be represented through facial expressions, movements, and sounds (speeches). For example, an expression such as laughter, surprise, embarrassment, or query may be represented through lighting of a display or light emitting diode (LED) provided in the AI agent 150. In addition, the AI agent 150 may represent gestures related to facial expressions, such as laughter, surprise, embarrassment, and doubt, through a movement thereof. In addition, the AI agent 150 may output a speech message including a predetermined content through sound (a speech).

Figure 2:
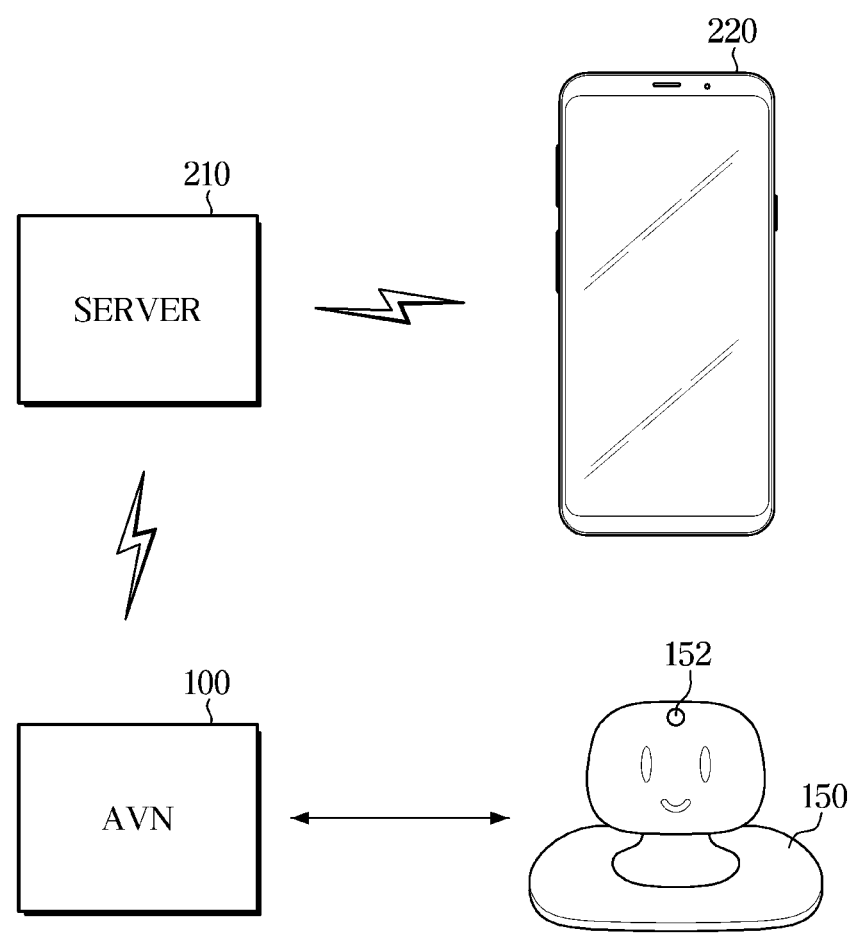
FIG. 2 is a view illustrating a communication connection of a vehicle according to an embodiment of the present disclosure.

FIG. 2 is a view illustrating a communication connection of a vehicle according to an embodiment of the present disclosure.

Referring to FIG. 2, the AVN system 100 and the AI agent 150 are communicatively connected to each other inside the vehicle. The AVN system 100 is connected to a server 210 at a remote site to enable wireless communication. The server 210 is connected to a mobile device 220 carried by passengers of the vehicle to enable wireless communication.

The server 210 may be a telematics server. A passenger may not need to be a person who is in the vehicle, and a person who alights from the vehicle temporarily after boarding the vehicle may be included in the scope of the passenger. The passenger may register his/her face identification (ID) and contact information in the server 210. The mobile device 220 of the passenger may be a terminal linked to a contact registered by the passenger in the server 210.

Figure 3:
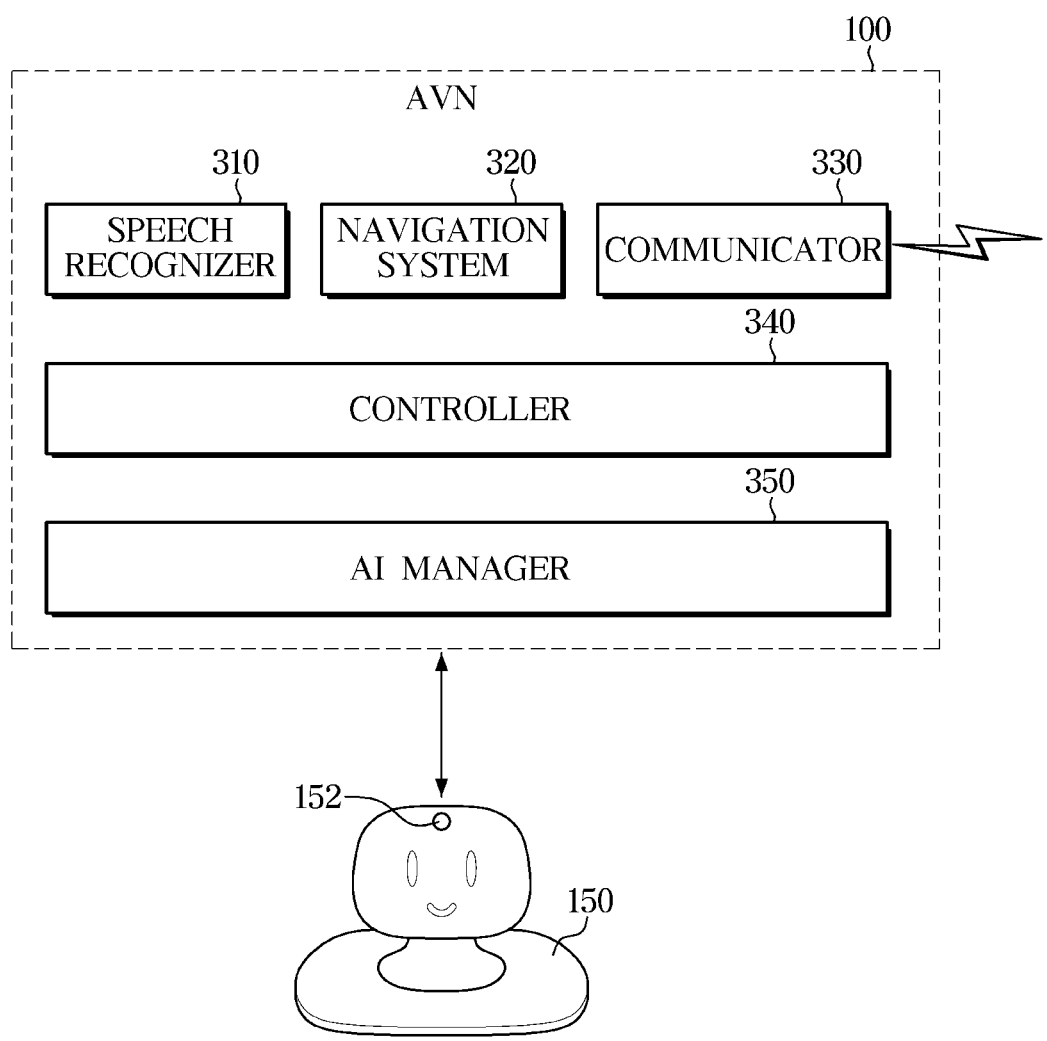
FIG. 3 is a view illustrating a configuration of an audio-video-navigation system of a vehicle according to an embodiment of the present disclosure.

FIG. 3 is a view illustrating a configuration of an AVN of a vehicle according to an embodiment of the present disclosure.

Referring to FIG. 3, the AVN system 100 may include a speech recognizer 310, a navigation system 320, a communicator 330, a controller 340, and an AI manager 350. The speech recognizer 310 receives a speech signal generated by an utterance of a passenger (a driver) or the AI agent 150 and performs data processing for speech recognition. The navigation system 320 performs a navigation function of the AVN system 100 and may include map data. The communicator 330 is provided to perform wireless communication with the server 210 at a remote site. The AI manager 350 is provided to perform communication and control of the AI agent 150.

The controller 340 is provided to control the overall operation of the AVN system 100 through cooperation with the speech recognizer 310, the navigation system 320, the communicator 330, the controller 340, and the AI manager 350. In particular, the controller 340 may check whether a passenger is to re-board the vehicle after alighting from the vehicle, and when needed, notify the current location of the vehicle to the passenger to re-board.

Figure 4:
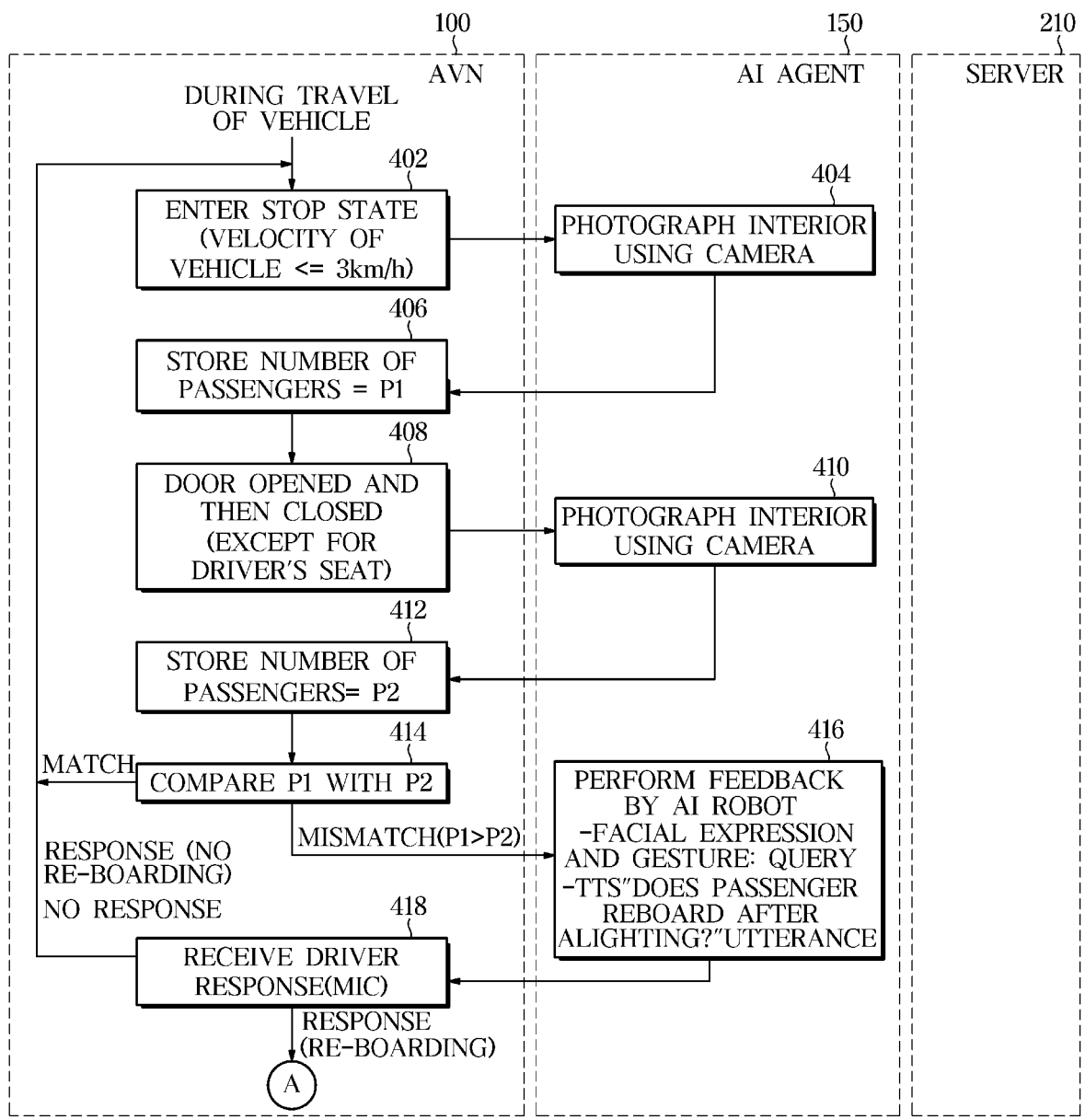
FIG. 4 is views illustrating the first example of a method of controlling a vehicle according to an embodiment of the present disclosure.
Figure 5:
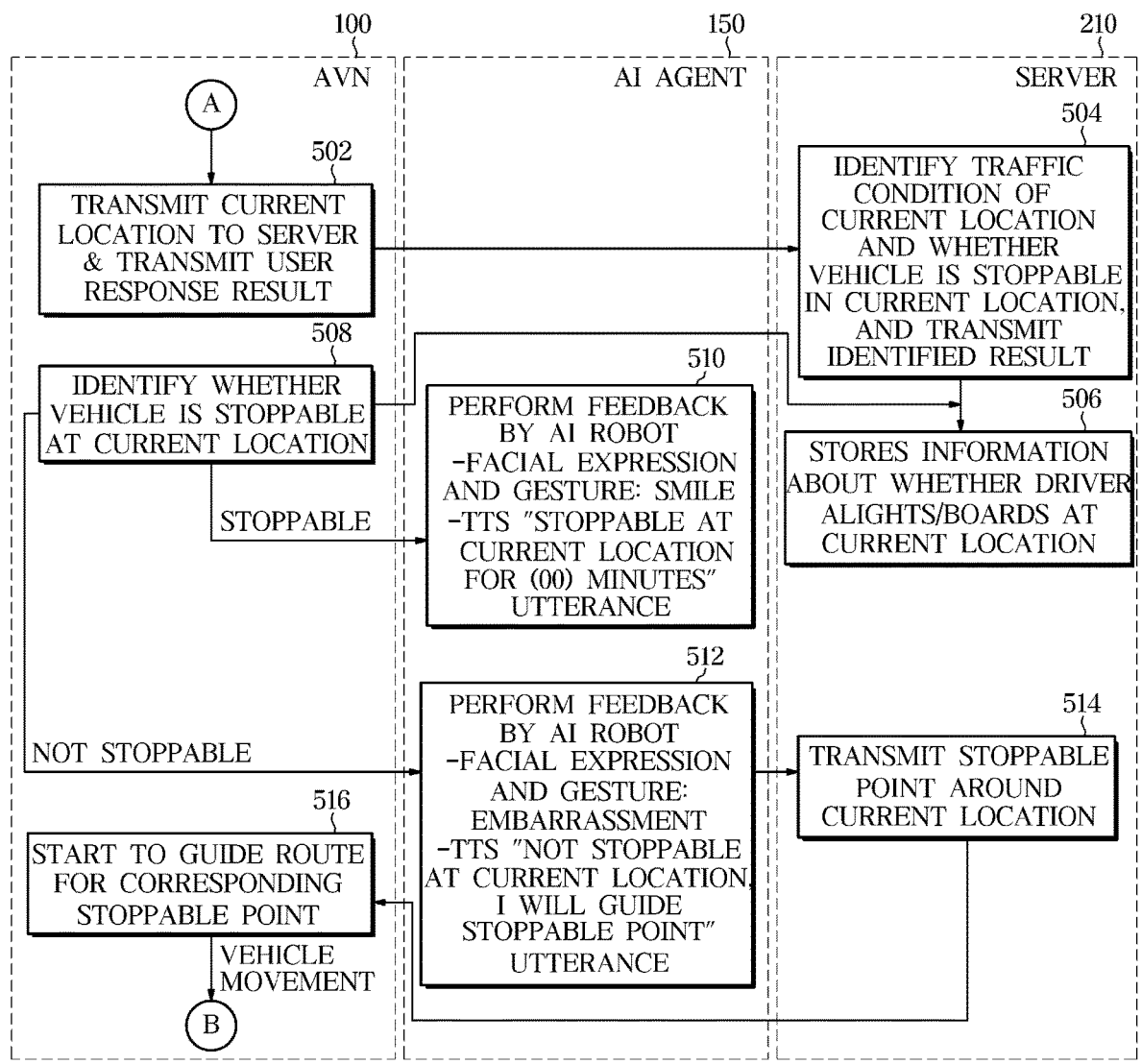
FIG. 5 is views illustrating the first example of a method of controlling a vehicle according to an embodiment of the present disclosure.
Figure 6:
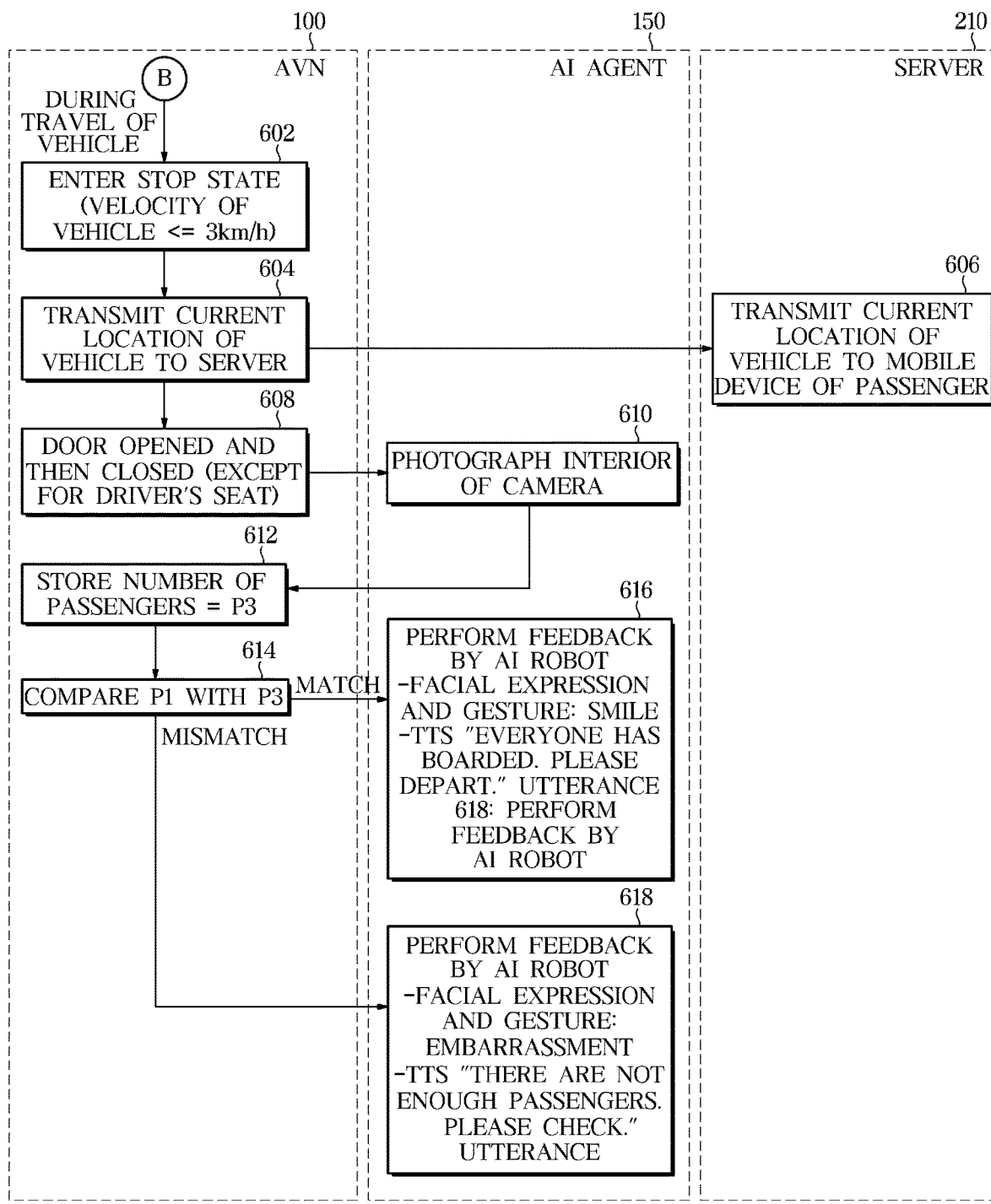
FIG. 6 is views illustrating the first example of a method of controlling a vehicle according to an embodiment of the present disclosure.

FIGS. 4 to 6 are views illustrating the first example of a method of controlling a vehicle according to an embodiment of the present disclosure. The method of controlling the vehicle illustrated in FIGS. 4 to 6, is provided to, when a plurality of passengers use the vehicle in a state where a specific destination is not set in the navigation system of the vehicle, check whether a passenger to re-board after alighting exists, and in response to existence of the passenger to re-board after alighting, notify the passenger of the current location of the vehicle. The embodiment is described with reference to three drawings of FIGS. 4 to 6.

First, referring to FIG. 4, during travel of the vehicle according to an embodiment of the present disclosure, the controller 340 of the AVN system 100 identifies whether the vehicle enters a stop state (402). The controller 340 may determine that the vehicle enters a stop state when the vehicle satisfies a predetermined stop condition. For example, when the velocity of the vehicle is 3 km/h or less, which is a predetermined vehicle velocity, the controller 340 may determine that the vehicle enters a stop state.

When the vehicle enters the stop state, the controller 340 photographs the interior of the vehicle using the camera 152 of the AI agent 150 (404). The photographing of the interior of the vehicle is to identify the number of passengers currently existing in the vehicle. When another camera is installed in the interior of the vehicle, the interior of the vehicle may be photographed using the other camera instead of the camera 152 of the AI agent 150.

When the first photographing of the interior of the vehicle using the camera 152 of the AI agent 150 is completed, the controller 340 identifies the number P1 of passengers currently existing in the vehicle through analysis of the first photographed image and stores the identified number P1 of passengers (406).

Afterwards, when the door of the vehicle is opened and then closed (that is, when it is identified that an alighting of a passenger has occurred) (408), the controller 340 photographs the interior of the vehicle again using the camera 152 of the AI agent 150 (410). The re-photographing of the interior of the vehicle is to identify the number of passengers in the vehicle after the door is opened and then closed again. When another camera is installed in the interior of the vehicle, the interior of the vehicle may be photographed using the other camera instead of the camera 152 of the AI agent 150. In the determination of whether an alight of passengers has occurred, it is identified that an alight of passengers has occurred when the door of the vehicle is opened and then closed again. Whether the door is opened and closed may be determined from generation of a vehicle door signal, that is, a door opening/closing signal.

When the second photographing of the interior of the vehicle using the camera 152 of the AI agent 150 is completed, the controller 340 may identify the number P2 of passengers currently existing in the vehicle through analysis of the secondarily photographed image and store the identified number P2 of passengers (412).

The controller 340 of the AVN system 100 compares the obtained numbers P1 and P2 of passengers and checks whether the numbers P1 and P2 match each other (414). The controller 340 compares the number P1 of passengers obtained before the door is opened and then closed after entering the stop state of the vehicle with the number P2 of passengers after the door is opened and then closed, thereby identifying whether a passenger to re-board after alighting exists.

When the numbers P1 and P2 of passengers match each other, the controller 340 identifies that there is no passenger to re-board after alighting and thus does not take any special follow-up action. Conversely, when the numbers P1 and P2 of passengers do not match each other (P1>P2), the controller 340 identifies that there is a passenger to re-board after alighting, and requests the AI agent 150 to perform a feedback corresponding to a case in which there is a passenger to re-board. In this case, the AI agent 150 may output a question, such as "Does a passenger who has alighted from the vehicle board again?", in the form of a speech message while representing a facial expression and gesture indicating a query (416). Through such a series of operations of the AI agent 150, the driver of the vehicle may recognize that some of the passengers of the vehicle having alighted from the vehicle are to re-board.

The driver of the vehicle may answer to the question of the AI agent 150. The driver's response may be provided through the microphone 106 of the vehicle. The controller 340 of the AVN system 100 may identify the existence of a passenger to re-board after alighting from the driver's response received through the microphone 106, and based on the identification result, may not take a special follow-up action or may take a follow-up action as shown in FIG. 5 (418). The driver's response to the question of the AI agent 150 in operation 416 in FIG. 4 may be classified as i) that there is no passenger to re-board, ii) no response, and iii) that there is a passenger to re-board. The controller 340 may not take a special follow-up action in the cases of i) and ii), and take a follow-up action in the case of iii), that is, when there is a passenger to re-board, as shown in FIG. 5.

In FIG. 5, the controller 340, based on receiving a response from the driver indicating that a passenger to re-board exists, transmits the current location of the vehicle and the result of the driver's response to the server 210 (502). That is, the controller 240 transmits, to the server 210, information indicating whether a passenger to re-board exists together with information about the current location of the vehicle responded by the driver.

The server 210 identifies a traffic condition of the current location of the vehicle and information indicating whether the vehicle is stoppable in the current location, and transmits the identified result to the vehicle (504). In addition, the server 210 also stores information indicating whether the driver alights or boards at the current location (506). Whether the driver alights or boards may be determined through the opening/closing of the door of the driver's seat of the vehicle.

The controller 340 of the AVN system 100 identifies whether the vehicle is stoppable at the current location based on the traffic condition at the current position and the information indicating whether the vehicle is stoppable at the current location that are received from the server 210 (508).

When the vehicle is stoppable at the current location, the AI agent 150 may perform feedback for guiding that the vehicle is stoppable (510). For example, the AI agent 150 may output a guide message, such as "You may stop at the current location for (00) minutes", in the form of a speech message while representing a facial expression and gesture indicating a smile. The driver of the vehicle may determine whether to stop the vehicle at the current location by referring to the guidance message output from the AI agent 150.

Conversely, when the vehicle is not stoppable at the current location, the AI agent 150 may perform feedback for guiding that the vehicle is not stoppable (512). For example, the AI agent 150 may output a guide message in the form of a speech message "You may not stop at the current location, so I will guide you where you can stop" while representing a facial expression and gesture indicating embarrassment. In addition, the AI agent 150 may request information about a nearby stoppable point from the server 210. The server 210 searches for a stoppable point around the current location of the vehicle in response to the request of the AI agent 150, and transmits the search result to the AVN system 100 of the vehicle (514). The AVN system 100 guides a route to the corresponding point with reference to information about the stoppable point received from the server 150 (516). The driver may move the vehicle to a stoppable point along the route guided by the AVN system 100.

In FIG. 6, the controller 340 of the AVN system 100 identifies whether the vehicle enters a stop state while the vehicle is moving to the stoppable point (602). The controller 340 may identify that the vehicle enters a stop state when the vehicle satisfies a predetermined stop condition. For example, when the velocity of the vehicle is 3 km/h or less, which is a predetermined vehicle velocity, the controller 340 may identify that the vehicle enters a stop state.

When it is identified that the vehicle enters the stop state, the controller 340 transmits the current location of the vehicle to the server 210 (604).

The server 150 transmits the current location of the vehicle received from the vehicle to the mobile device 220 of the passenger (606). A passenger who fails to re-board after alighting may identify that the vehicle is moving to pick him/her up by checking the current location of the vehicle through the current location information of the vehicle provided from the server 210 and feel relieved.

Afterwards, when the door of the vehicle is opened and then closed (that is, when it is identified that an alighting of passenger has occurred) (608), the controller 340 photographs the interior of the vehicle using the camera 152 of the AI agent 150 (610). The photographing of the interior of the vehicle is to identify the number of passengers in the vehicle after the door is opened and then closed. When another camera is installed in the interior of the vehicle, the interior of the vehicle may be photographed using the other camera instead of the camera 152 of the AI agent 150. In the identification of whether an alight of passenger has occurred, it is identified that an alight of passengers has occurred when the door of the vehicle is opened and then closed. Whether the door is opened and closed may be identified from generation of a vehicle door signal, that is, a door opening/closing signal.

When the third photographing of the interior of the vehicle using the camera 152 of the AI agent 150 is completed, the controller 340 identifies the number P3 of passengers currently existing in the vehicle through analysis of the photographed third image, and stores the identified number P3 of passengers currently existing in the vehicle (612).

The controller 340 of the AVN system 100 compares the number P1 of passengers obtained through the first photographing with the number P3 of passengers obtained through the third photographing, and checks whether the numbers P1 and P3 match each other (S614). Through the comparison, it may be checked whether all passengers alighted from the vehicle have re-boarded.

Since the numbers P1 and P3 of passengers matching each other represents a case in which all passengers alighted have re-boarded, the controller 340 requests the AI agent 150 to perform feedback corresponding to a case when all passengers alighted have re-boarded. In this case, the AI agent 150 may output a guide message, such as "Everyone has boarded. Please depart", in the form of a speech message while representing a facial expression and gesture indicating a smile (616). The driver of the vehicle may recognize that all the original passengers of the vehicle have boarded from the feedback of the AI agent 150.

Conversely, when the numbers P1 and P3 of passengers do not match each other (P1>P3), the controller 340 identifies that there is an alighted passenger who needs to re-board, and requests the AI agent 150 to perform feedback corresponding a case in which there is a passenger needing to re-board. In this case, the AI agent 150 may output a request message, such as "There are not enough passengers. Please check it" in the form of a speech message while representing a facial expression and gesture indicating embarrassment (618). The driver of the vehicle may identify whether all passengers have boarded according to the request message of the AI agent 150.

The method of controlling the vehicle as shown in FIGS. 4 to 6 may prevent a passenger from failing to re-board the vehicle when a plurality of passengers use the vehicle, or take an action so that all passengers board the vehicle without missing.

Figure 7:
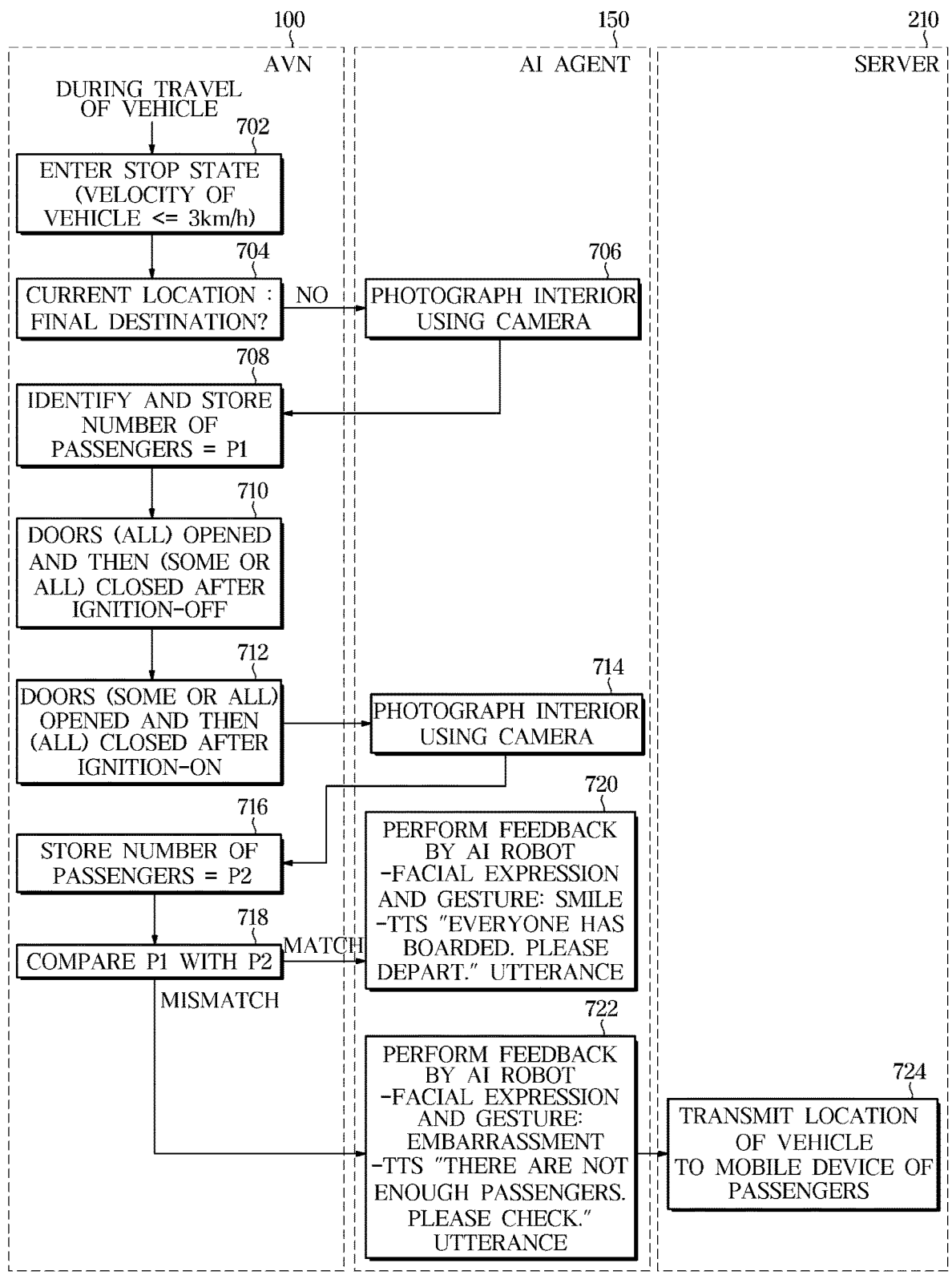
FIG. 7 is a view illustrating the second example of a method of controlling a vehicle according to an embodiment of the present disclosure.

FIG. 7 is a view illustrating the second example of a method of controlling a vehicle according to an embodiment of the present disclosure. The method of controlling the vehicle illustrated in FIG. 7 is provided to, when a plurality of passengers use the vehicle in a state where a specific destination is set in the navigation system of the vehicle, check a re-board of passengers after alighting, and in response to a passenger to re-board after alighting being existing, notify the passenger of the current location of the vehicle.

First, referring to FIG. 7, during travel of the vehicle according to an embodiment of the present disclosure, the controller 340 of the AVN system 100 identifies whether the vehicle enters a stop state (702). The controller 340 may identify that the vehicle enters a stop state when the vehicle satisfies a predetermined stop condition. For example, when the velocity of the vehicle is 3 km/h or less, which is a predetermined vehicle velocity, the controller 340 may determine that the vehicle enters a stop state.

When the vehicle enters the stop state, the controller 340 checks whether the vehicle has arrived at the destination set in the AVN system 100 (704). An arrival of the vehicle at the destination is followed by an alighting of all passengers including the driver, but a stop of the vehicle before arriving at the destination may cause a need to monitor re-boarding of passengers after alighting.

Accordingly, when the vehicle enters a stop state before arriving at the destination (No in operation 704), the controller 340 photographs the interior of the vehicle using the camera 152 of the AI agent 150 (706). Photographing of the interior of the vehicle is to identify the number of passengers currently in the vehicle. When another camera is installed in the interior of the vehicle, the interior of the vehicle may be photographed using the other camera instead of the camera 152 of the AI agent 150.

When the first photographing of the interior of the vehicle using the camera 152 of the AI agent 150 is completed, the controller 340 identifies the number P1 of passengers currently existing in the vehicle through analysis of the first photographed image, and stores the identified number P1 of passengers currently existing in the vehicle (708).

The controller 340 checks whether the vehicle is turned off, all the doors of the vehicle are opened, and then some or all of the doors are closed again (S710). This is to check that all passengers alight from the vehicle. In addition, the controller 340 checks whether the vehicle is turned on, some or all doors of the vehicle are opened, and then all doors are closed again (712). This is to check whether all passengers alighted from the vehicle re-board. The controller 340 may more accurately identify passenger's re-board after alighting by considering a series of operations of turn-off of the vehicle, turn-on of the vehicle, and sequentially performed opening and closing of some or all doors. Alighting of passengers may be determined from the door of the vehicle being opened and then closed after turn-on of the vehicle.

Whether the door is open and closed may be identified from the generation of a vehicle door signal, that is, a door opening/closing signal.

Accordingly, when the situations 710 and 712 related to vehicle turn on/off and door opening/closing occur (408), the controller 340 secondarily photographs the interior of the vehicle using the camera 152 of the AI agent 150 once more (714). The second photographing of the interior of the vehicle is to identify the number of passengers in the vehicle after the situations related to vehicle's turn on/off and door opening/closing. When another camera is installed in the interior of the vehicle, the interior of the vehicle may be photographed using the other camera instead of the camera 152 of the AI agent 150.

When the second photographing of the interior of the vehicle using the camera 152 of the AI agent 150 is completed, the controller 340 identifies the number P2 of passengers currently existing in the vehicle through analysis of the secondarily photographed image, and stores the identified number P2 of passengers currently existing in the vehicle (716).

The controller 340 of the AVN system 100 compares the number P1 of the passengers obtained through the first photographing with the number P2 of the passengers obtained through the second photographing, and checks whether the numbers P1 and P2 match each other (718). Through the comparison, it may be checked whether all passengers alighted have re-boarded before the vehicle arrives at the destination.

Since the numbers P1 and P2 of passengers matching each other represents a case that all passengers alighted have re-boarded, the controller 340 requests the AI agent 150 to perform feedback corresponding to the case where all passengers alighted have re-boarded. In this case, the AI agent 150 may output a guide message, such as "Everyone is on board. Please depart" in the form of a speech message while representing a facial expression and gesture indicating a smile (720). The driver of the vehicle may recognize that all the original passengers of the vehicle have boarded from the feedback of the AI agent 150.

Conversely, since the numbers P1 and P2 of passengers not matching each other (P1>P2) represents that there is a passenger needing to re-board after alighting, the controller 340 requests the AI agent 150 to perform feedback corresponding to a case where there is a passenger needing to re-board. In this case, the AI agent 150 may output a request message, such as "There are not enough passengers. Please check it" in the form of a speech message while representing a facial expression and gestures indicating embarrassment (722). The driver of the vehicle may check whether all passengers are on board according to such a request message of the AI agent 150.

In addition, the server 150 transmits the current location of the vehicle to the mobile device 220 of the passenger (724). The passenger who fails to re-board after alighting from the vehicle may check the current location of the vehicle through the current location information of the vehicle provided from the server 210.

According to the method of controlling the vehicle as shown in FIG. 7, when a route is guided by the AVN system 100 with a destination set in advance, a passenger may be prevented from failing to re-board the vehicle during operation of vehicle, or take an action so that all passengers board the vehicle without missing.

Figure 8:
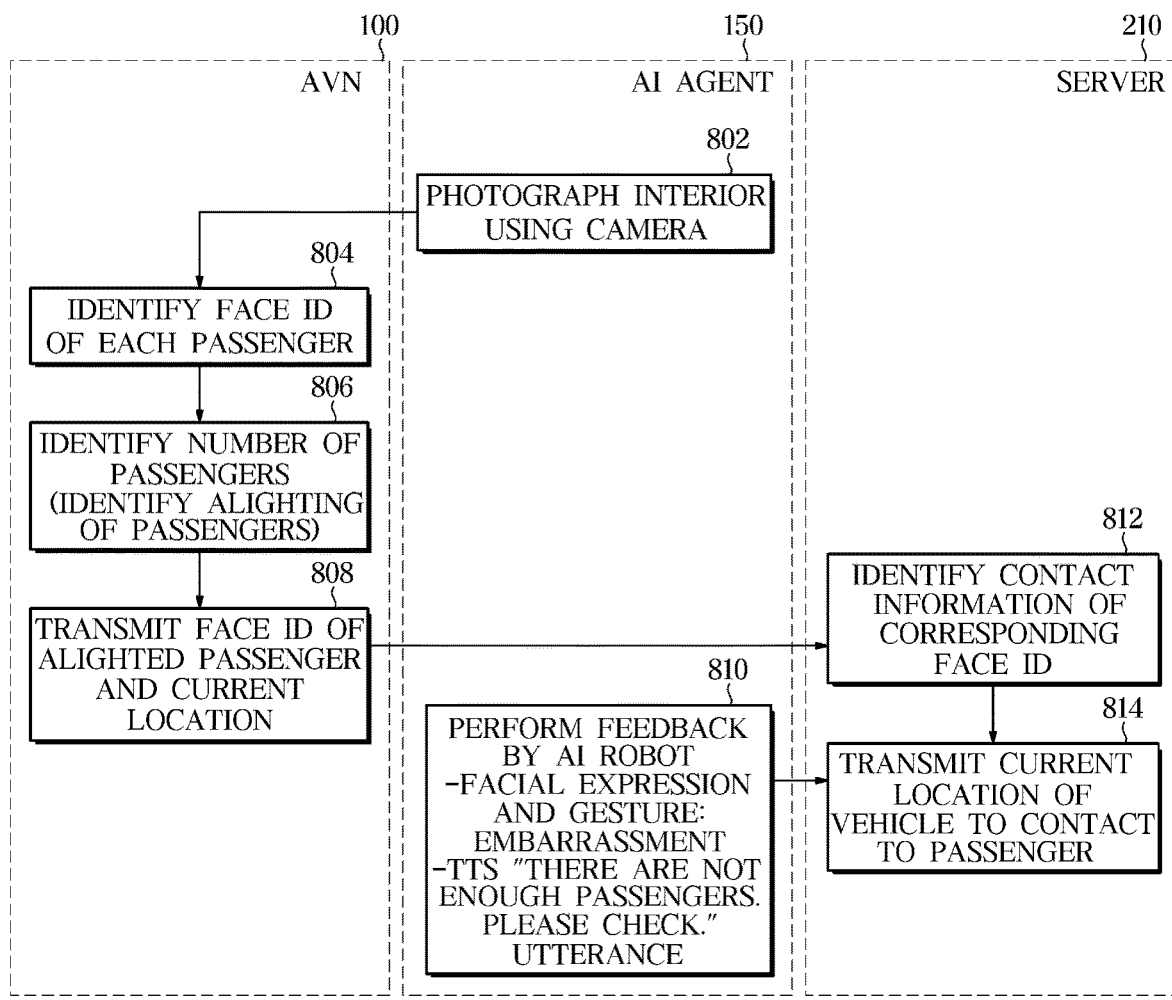
FIG. 8 is a view illustrating the third example of a method of controlling a vehicle according to an embodiment of the present disclosure.

FIG. 8 is a view illustrating the third example of a method of controlling a vehicle according to an embodiment of the present disclosure. The method of controlling the vehicle shown in FIG. 8 is to identify a passenger needing to re-board after alighting through passengers' face IDs, and notify the current location of the vehicle only to the passenger needing to re-board after alighting by referring to the identification result through the face ID.

Referring to FIG. 8, when the driving of the vehicle starts, the controller 340 photographs the interior of the vehicle using the camera 152 of the AI agent 150 (802). Photographing of the interior of the vehicle is to identify the number of passengers currently exiting in the vehicle. When another camera is installed in the interior of the vehicle, the interior of the vehicle may be photographed using the other camera instead of the camera 152 of the AI agent 150.

The controller 340 of the AVN system 100 checks face IDs of the passengers in the vehicle through analysis of images photographed using the camera 152 of the AI agent 150 (804).

Next, the controller 340 of the AVN system 100 checks the number of passengers in the vehicle from the analysis result of the photographed image (806). That is, in the same situation as described in the first embodiment described of FIGS. 4 to 6 or the second embodiment of FIG. 7, it is checked whether there is a passenger to re-board after alighting.

When there is a passenger to re-board after alighting, the face ID of the passenger to re-board after alighting and the current location of the vehicle are transmitted to the server 210 (808).

When there is a passenger to re-board after alighting, the controller 340 requests the AI agent 150 to perform feedback corresponding to a case in which a passenger to re-board exists. In this case, the AI agent 150 may output a request message, such as "There are not enough passengers. Please check it" in the form of a speech message while representing a facial expression and gestures indicating embarrassment (810).

The server 210 checks registered contact information of the passenger of the face ID transmitted from the vehicle, that is, the passenger to re-board after alighting (812).

In addition, the server 210 transmits the current location of the vehicle to the registered contact information of the passenger of the corresponding face ID, that is, the passenger to re-board after alighting (814). A passenger who fails to re-board after alighting may check the current location of the vehicle through the current location information of the vehicle provided from the server 210.

Figure 9:
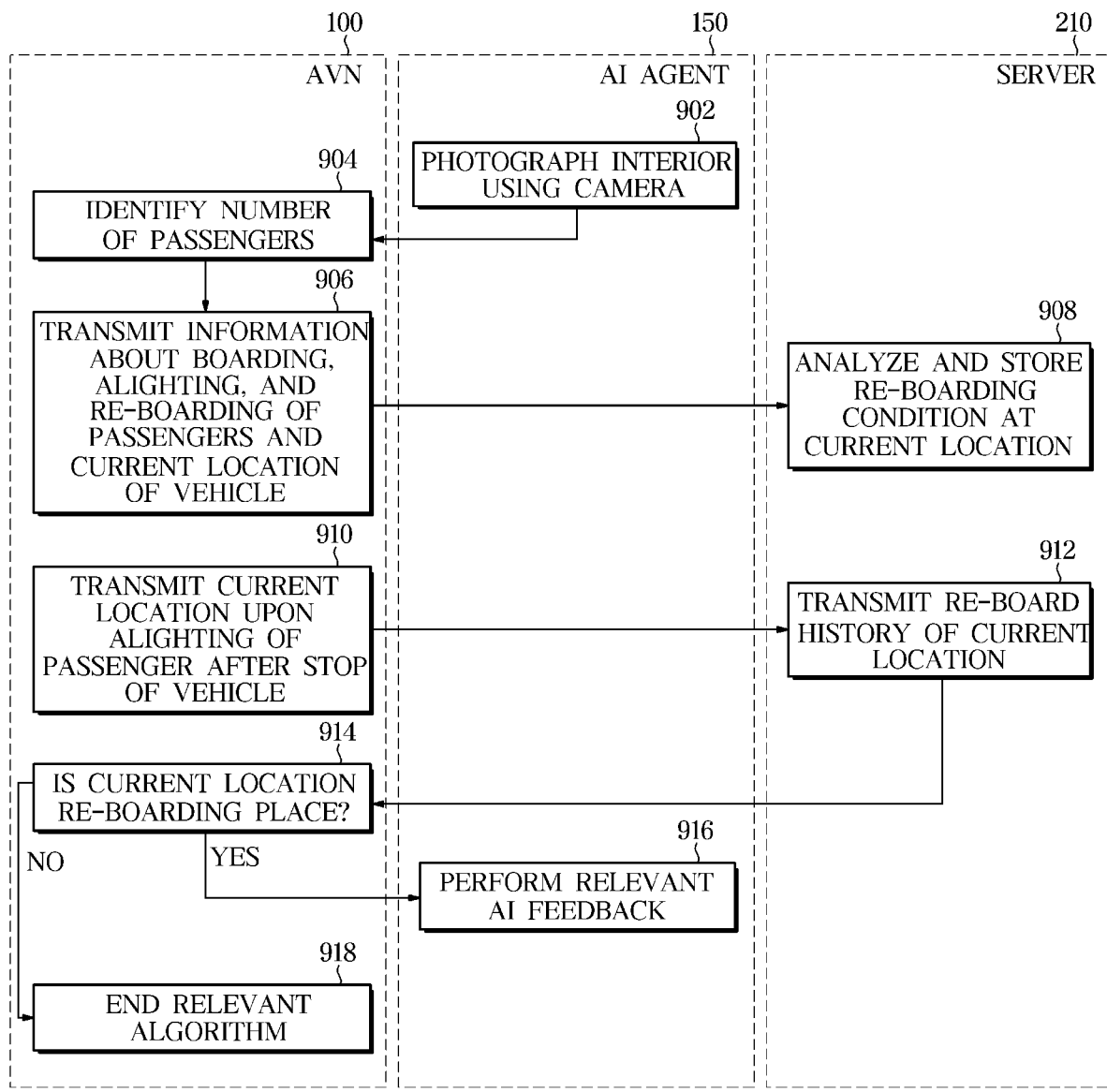
FIG. 9 is a view illustrating the fourth example of a method of controlling a vehicle according to an embodiment of the present disclosure.

FIG. 9 is a view illustrating the fourth example of a method of controlling a vehicle according to an embodiment of the present disclosure. The method of controlling the vehicle illustrated in FIG. 9 is to check whether a passenger to re-board after alighting exists when a place in which a passenger of a vehicle currently re-boards after alighting is a place having a re-board history regarding a re-board of passengers after alighting in the past.

Referring to FIG. 9, when the driving of the vehicle starts, the controller 340 photographs the interior of the vehicle using the camera 152 of the AI agent 150 (902). Photographing of the interior of the vehicle is to identity the number of passengers currently existing in the vehicle. When another camera is installed in the interior of the vehicle, the interior of the vehicle may be photographed using the other camera instead of the camera 152 of the AI agent 150.

The controller 340 of the AVN system 100 checks the number of passengers in the vehicle through analysis of the image photographed using the camera 152 of the AI agent 150 (904). That is, in the same situation as described in the first embodiment described of FIGS. 4 to 6 or the second embodiment of FIG. 7, it is checked whether there is a passenger to re-board after alighting.

The controller 340 of the AVN system 100 transmits, to the server 210, information about boarding, alighting, and re-boarding of passengers and information about the current location of the vehicle (906).

The server 210 analyzes the information about boarding, alighting, and re-boarding conditions (information indicating whether re-boarding occurs) and the information about the current location of the vehicle, which are transmitted from the vehicle, and stores the analyzed information (908). That is, the server 210 identifies that alighting and re-boarding of passengers have occurred at the current location of the vehicle, and stores the re-board history regarding re-board after alighting, together with the location information.

Thereafter, in response to an alighting of a passenger after a stop of the vehicle at a predetermined place, the controller 340 of the AVN system 100 transmits the current location of the vehicle to the server 210 (910).

After receiving the current location from the vehicle, the server 210 searches for a re-board history at the current location of the vehicle and transmits the search result to the AVN system 100 of the vehicle (S912). This is to enable the AVN system 100 of the vehicle to identify whether the current location of the vehicle is a location having a re-board history regarding a re-boarding after alighting in the past.

When the current location of the vehicle is a place having a re-board history (YES in operation 914), the controller 340 requests the AI agent 150 to perform AI feedback related to re-boarding. In this case, the AI agent 150 may output the same facial expression, gesture, and speech message as those described in the first to third embodiments described above, depending on whether there is a passenger to re-board after alighting or whether all passengers have re-boarded after alighting (916).

Conversely, when the current location of the vehicle is a location having no re-board history (No in operation 914), the controller 340 ends the relevant algorithm (918).

The identification of the re-boarding condition shown in FIG. 9 may be implemented in various ways in consideration of various different situations as follows.

<Repetition of a 'Positive' Answer of a Driver to Re-Boarding at the Current Location Three Times in a Row>

When the condition is satisfied, it is identified that re-boarding is in progress at the current location (the re-boarding condition is satisfied). Therefore, in this case, when an operation of comparing the numbers of passengers at the current location is executed in the future, the comparison of passengers is immediately performed in response to the door being opened and then closed without asking the driver whether the current location is a re-boarding location.

<Repetition of a 'Negative' Answer of a Driver to Re-Boarding at the Current Location Three Times in a Row>

When the condition is satisfied, it is identified that only alighting is performed at the current location and re-boarding is not performed (re-boarding condition unsatisfactory). Accordingly, in this case, when an operation of comparing the numbers of passengers at the current location is executed in the future, an operation of asking the driver whether the current location is a re-boarding location is performed.

<Execution of Passenger Comparison after Omitting Driver Inquiry>

When the vehicle is stopped at a predetermined specific place and an operation of the door being opened and then closed is performed, an operation of asking the driver whether the current location is a re-boarding location is omitted, and the passenger comparison operation is immediately executed (re-boarding condition is satisfied). Here, the specific place may be, for example, a place around a cafe, restaurant, or highway rest area. At cafes, restaurants, and highway rest areas, there is a very high probability that an alighting and re-boarding occurs, so that a passenger comparison operation may be immediately executed while omitting an operation of asking whether a re-boarding occurs.

<Omission of Both the Driver Inquiry Operation and the Passenger Comparison Operation>

When the door is opened and then closed after stopping at another specific location, an operation of asking the driver whether the current location is a re-boarding location and a passenger comparison operation are omitted (re-boarding condition unsatisfactory). Here, another specific place may be, for example, a place adjacent to an academy or a school. In the case of academies or schools, classes are held for a relatively long time, so there is a very high probability that a re-boarding after alighting does not occur. Specifically, a relatively long time needs to elapse between an alighting and a re-boarding. Therefore, in this case, it is preferable not to ask whether the current location is a re-boarding location, and it is also preferable to omit the passenger comparison operation.

As is apparent from the above, the vehicle and the method of controlling the same, in a temporary stop state of the vehicle during driving, can identify some passenger failing to re-board after alighting, and communicate with the passenger to guide the passenger to re-board the vehicle.

The above description of the present disclosure is for illustrative purposes, and a person having ordinary skilled in the art should appreciate that other specific modifications may be easily made without departing from the technical spirit or essential features of the present disclosure. Therefore, the above embodiments should be regarded as illustrative rather than limitative in all aspects. The scope of the disclosure is not to be limited by the detailed description set forth above, but by the accompanying claims of the present disclosure, and it should also be understood that all changes or modifications derived from the definitions and scope of the claims and their equivalents fall within the scope of the present disclosure.

What is claimed is:

1. A method of controlling a vehicle, the method comprising:
   primarily checking a number of passengers inside the vehicle through analysis of a first image obtained by photographing an interior of the vehicle when the vehicle enters a stop state;
   in response to a door signal of the vehicle being generated, secondly checking the number of the passengers inside the vehicle through analysis of a second image obtained by photographing the interior of the vehicle;
   in response to the secondly checked number of the passengers being less than the primarily checked number of the passengers, displaying that a passenger to re-board after alighting exists through a display device of the vehicle;
   re-stopping to pick up the passenger to re-board after alighting;
   in response to a door signal of the vehicle being generated again, thirdly checking the number of the passengers inside the vehicle through analysis of a third image obtained by photographing the interior of the vehicle; and in response to the thirdly checked number of the passengers being less than the firstly checked number of the passengers, identifying that the passenger to re-board after alighting exists.

2. The method of claim 1, further comprising, upon identifying that the passenger to re-board after alighting exists, checking a point adjacent to the vehicle at which stop is performable to pick up the passenger to re-board after alighting, and
searching for a stoppable point when the stop is not performable in the point.

3. The method of claim 2, further comprising notifying a current location of the vehicle to the passenger to re-board after alighting while moving the vehicle to the stoppable point.

4. The method of claim 1, wherein the display device is an artificial intelligence (AI) agent provided to represent a facial expression and a gesture and output a speech message.

5. The method of claim 1, further comprising, when a destination of the vehicle is set in a navigation system of the vehicle, and the vehicle is stopped before the vehicle reaches the destination, identifying whether a passenger to re-board after alighting from the vehicle exists.

6. The method of claim 1, further comprising:
Obtaining face identifications (IDs) of the passengers through analysis of images obtained by photographing the passengers in the vehicle; and
in response to identifying that a passenger to re-board after alighting exists, classifying the passenger to re-board after alighting through the face ID and notifying a current location of the vehicle only to the passenger to re-board after alighting.

7. The method of claim 1, further comprising:
storing a re-board history regarding re-board of passengers after alighting, while the vehicle is operating; and
whenever the re-board of the passenger after alighting is performed pursuant to a stop of the vehicle, identifying whether the passenger to re-board after alighting exists in a place where the vehicle is stopped, based on the stored re-board history regarding re-board of the passengers after alighting.

8. The method of claim 7, further comprising, when a driver of the vehicle repeats a positive answer to an inquiry output through the display device to inquire about the presence of a passenger re-boarding at a current location by a preset number of times or more, identifying the current location of the vehicle as a place that satisfies a preset re-boarding condition, and omitting a driver acknowledgement check and performing a passenger comparison.

9. The method of claim 7, further comprising, when a current location of the vehicle is a place that is set in advance as a place where re-boarding is expected after alighting,
identifying the current location of the vehicle as a place that satisfies a preset re-boarding condition, and
omitting a driver acknowledgement check and performing a passenger comparison.

10. The method of claim 7, further comprising, when a current location of the vehicle is a place that is set in advance as a place where re-boarding is not expected after alighting,
identifying the current location of the vehicle as a place that does not satisfies a preset re-boarding condition, and
omitting a driver acknowledgement check and a passenger comparison.

11. A vehicle comprising:
a camera configured to photograph an interior of a vehicle; and
a controller configured to,
primarily check a number of passengers inside the vehicle through analysis of a first image obtained by photographing an interior of the vehicle when the vehicle enters a stop state;
in response to a door signal of the vehicle being generated, secondly checking the number of the passengers inside the vehicle through analysis of a second image obtained by photographing the interior of the vehicle;
in response to the secondly checked number of the passengers being less than the primarily checked number of the passengers, display that a passenger to re-board after alighting exists through a display device of the vehicle;
re-stop the vehicle to pick up the passenger to re-board after alighting;
in response to a door signal of the vehicle being generated again, thirdly check the number of the passengers inside the vehicle through analysis of a third image obtained by photographing the interior of the vehicle; and
in response to the thirdly checked number of the passengers being less than the firstly checked number of the passengers, identify that the passenger to re-board after alighting exists.

12. The vehicle of claim 11, wherein the controller is configured to, upon identifying that the passenger to re-board after alighting exists, check a point adjacent to the vehicle at which stop is performable to pick up the passenger to re-board after alighting, and search for a stoppable point when the stop is not performable in the point.

13. The vehicle of claim 12, wherein the controller is configured to notify a current location of the vehicle to the passenger to re-board after alighting while moving the vehicle to the stoppable point.

14. The vehicle of claim 11, wherein the display device is an artificial intelligence (AI) agent provided to represent a facial expression and a gesture and output a speech message.

15. The vehicle of claim 11, wherein when a destination of the vehicle is set in a navigation system of the vehicle, and the vehicle is stopped before the vehicle reaches the destination, it is identified whether the passenger to re-board after alighting from the vehicle exists.

16. The vehicle of claim 11, wherein the controller is configured to:
obtain face identifications (IDs) of the passengers through analysis of images obtained by photographing the passengers in the vehicle; and
in response to identifying that a passenger to re-board after alighting exists, classify the passenger to re-board after alighting through the face ID and notify a current location of the vehicle only to the passenger to re-board after alighting.

17. The vehicle of claim 11, wherein the controller is configured to:
store a re-board history regarding re-board of passengers after alighting, while the vehicle is operating; and
whenever the re-board of the passenger after alighting is performed pursuant to a stop of the vehicle, identify whether the passenger to re-board after alighting exists in a place where the vehicle is stopped, based on the stored re-board history regarding re-board of passengers after alighting.

18. The vehicle of claim 17, wherein the controller is configured to, when a driver of the vehicle repeats a positive answer to an inquiry output through the display device to inquire about the presence of a passenger re-boarding at a current location by a preset number of times or more, identify the current location of the vehicle as a place that satisfies a preset re-boarding condition, and omit a driver acknowledgement check and perform a passenger comparison.

19. The vehicle of claim 17, wherein the controller is configured to, when a current location of the vehicle is a place that is set in advance as a place where re-boarding is expected after alighting, identify the current location of the vehicle as a place that satisfies a preset re-boarding condition, and omit a driver acknowledgement check and perform a passenger comparison.

20. The vehicle of claim 17, wherein the controller is configured to, when a current location of the vehicle is a place that is set in advance as a place where re-boarding is not expected after alighting, identify the current location of the vehicle as a place that does not satisfies a preset re-boarding condition, and omit a driver acknowledgement check and a passenger comparison.

21. A method of controlling a vehicle, the method comprising:
   primarily checking a number of passengers inside the vehicle through analysis of a first image obtained by photographing an interior of the vehicle when the vehicle enters a stop state;
   in response to a door signal of the vehicle being generated, secondly checking the number of the passengers inside the vehicle through analysis of a second image obtained by photographing the interior of the vehicle;
   in response to the secondly checked number of the passengers being less than the primarily checked number of the passengers, identifying that a passenger to re-board after alighting exists;
   in response to identifying that the passenger to re-board after alighting exists, displaying that the passenger to re-board after alighting exists through an artificial intelligence (AI) provided in the vehicle in a form of a facial expression, a gesture, and a speech message;
   re-stopping to pick up the passenger to re-board after alighting;
   in response to a door signal of the vehicle being generated again, thirdly checking the number of the passengers inside the vehicle through analysis of a third image obtained by photographing the interior of the vehicle; and
   in response to the thirdly checked number of the passengers being less than the firstly checked number of the passengers, identifying that the passenger to re-board after alighting exists.

22. A vehicle comprising:
   a camera configured to photograph an interior of the vehicle;
   a controller configured to:
      primarily check a number of passengers inside the vehicle through analysis of a first image obtained by photographing an interior of the vehicle when the vehicle enters a stop state;
      in response to a door signal of the vehicle being generated, secondly check the number of the passengers inside the vehicle through analysis of a second image obtained by photographing the interior of the vehicle;
      in response to the secondly checked number of the passengers being less than the primarily checked number of the passengers, identify that a passenger to re-board after alighting exists;
   display that the passenger to re-board after alighting exists through an artificial intelligence (AI) provided in the vehicle in a form of a facial expression, a gesture, and a speech message;
   re-stop the vehicle to pick up the passenger to re-board after alighting;
   in response to a door signal of the vehicle being generated again, thirdly check the number of the passengers inside the vehicle through analysis of a third image obtained by photographing the interior of the vehicle; and
   in response to the thirdly checked number of the passengers being less than the firstly checked number of the passengers, identify that the passenger to re-board after alighting exists.

* * * * *